United States Patent
Yamada

(10) Patent No.: US 9,586,539 B2
(45) Date of Patent: Mar. 7, 2017

(54) UNDERFLOOR SHIELDED HARNESS

(71) Applicant: Yazaki Corporation, Minato-ku, Tokyo (JP)

(72) Inventor: Maki Yamada, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/392,151

(22) PCT Filed: May 29, 2014

(86) PCT No.: PCT/JP2014/064278
§ 371 (c)(1),
(2) Date: Dec. 23, 2015

(87) PCT Pub. No.: WO2014/208263
PCT Pub. Date: Dec. 31, 2014

(65) Prior Publication Data
US 2016/0272130 A1    Sep. 22, 2016

(30) Foreign Application Priority Data

Jun. 27, 2013  (JP) ................ 2013-134555

(51) Int. Cl.
*B60R 16/02*  (2006.01)
*H01B 9/02*   (2006.01)

(52) U.S. Cl.
CPC .......... *B60R 16/0215* (2013.01); *H01B 9/02* (2013.01)

(58) Field of Classification Search
CPC .............. B60R 16/0215; H01B 9/02

USPC ...................................... 174/72 A
See application file for complete search history.

(56) References Cited

U.S. PATENT DOCUMENTS

| | | | |
|---|---|---|---|
| 5,777,273 A | * | 7/1998 | Woody .................. H01B 9/003 174/113 R |
| 7,105,746 B2 | | 9/2006 | Shimura |
| 2005/0006127 A1 | | 1/2005 | Shimura |
| 2011/0155458 A1 | | 6/2011 | Kato et al. |

(Continued)

FOREIGN PATENT DOCUMENTS

| | | | |
|---|---|---|---|
| CN | 204197065 U | * | 3/2015 |
| JP | H04-61418 A | | 5/1992 |

(Continued)

OTHER PUBLICATIONS

Dec. 29, 2015—(WO) IPRP—App PCT/JP2014/064278.
Aug. 26, 2014—International Search Report—Intl App PCT/JP2014/064278.

*Primary Examiner* — Timothy Thompson
*Assistant Examiner* — Charles Pizzuto
(74) *Attorney, Agent, or Firm* — Banner & Witcoff, Ltd.

(57) ABSTRACT

An underfloor shielded harness (100) has a long conductive plate which is wound so as to have at least two internal spaces (104, 105) in a cross section taken perpendicularly to the longitudinal direction. High-voltage cables (102) is inserted in the internal space (104) of the conductive plate (103) and the low-voltage cable (101) is inserted in the internal space (105) that is different from the internal space (104) in which the high-voltage cables (102) is inserted. At least one of the two internal spaces (104, 105) communicates with the outside of the spaces (104, 105) formed by the conductive plate (103).

5 Claims, 4 Drawing Sheets

(56) References Cited

U.S. PATENT DOCUMENTS

2012/0162959 A1*  6/2012  Terada ................ B60N 2/0715
                                                            361/826
2013/0092434 A1    4/2013  Kato et al.

FOREIGN PATENT DOCUMENTS

| JP | H10-116519 A | 5/1998 | | |
|---|---|---|---|---|
| JP | 2004-355839 A | 12/2004 | | |
| JP | 2012-005272 A | 1/2012 | | |
| JP | 2012-134367 A | 7/2012 | | |
| WO | WO 2012053662 A1 * | 4/2012 | ............. | H05K 9/002 |

* cited by examiner

UNDERFLOOR SHIELDED HARNESS

TECHNICAL FIELD

The present invention relates to an underfloor shielded harness.

BACKGROUND ART

In recent years, in the automobile industry, various high-voltage cables are being proposed in connection with the current trend of a transition from gasoline vehicles to electric vehicles. Such high-voltage cables are required to be high in the cable-to-cable shield performance. To this end, necessary shield performance of harnesses having high-voltage cables is secured in such a manner that each high-voltage cable is covered with a conductive braid and resulting high-voltage cables are bundled and coated together by extrusion molding and then inserted in a sheath member such as a corrugated tube (refer to Patent document 1).

However, in the harness disclosed in Patent document 1, each high-voltage cable needs to be covered with a conductive braid, which increases the number of steps of manufacture and the number of components.

In underfloor harnesses which are routed across a vehicle body underfloor surface which is the outside surface of a vehicle body frame, it is conceivable that in the future a high-voltage cable that connects a battery and an inverter and a low-voltage cable for supplying voltages to various devices from a low-voltage (12 V) battery will be routed parallel with each other. In this case, the high-voltage cable and the low-voltage cable are shielded individually and then bundled using a sheath member, which is an additional factor in increasing the number of steps.

In view of the above, a wire harness has been proposed in which the entire outer circumference of a high-voltage cable and that of a low-voltage cable are enclosed separately by an insulating sheet. In this wire harness, the high-voltage cable can be shielded and the high-voltage cable and the low-voltage cable can be bundled merely by curling the insulating sheet, as a result of which increase in the number of steps of manufacture and the number of components can be suppressed (refer to Patent document 2).

Another wire harness has been proposed in which a metal pipe having a shield wall is formed by extrusion molding. A high-voltage cable is housed in a space located on one side of the shield wall and a low-voltage cable is housed on the other side of the shied wall (refer to Patent document 3).

CITATION LIST

Patent Literature

Patent document 1: JP-A-10-116519
Patent document 2: JP-A-2004-355839
Patent document 3: JP-A-2012-134367

SUMMARY OF THE INVENTION

Technical Problem

However, in the wire harness disclosed in Patent document 2, since it is configured in such a manner that the insulating sheet is curled, the insulating sheet which is insufficient in terms of functions necessary for an exterior member is used as a sheath member. Particularly in an environment of a vehicle underfloor surface which is associated with such problems as being hit by pebbles, the use of an insulating sheet that is insufficient in terms of functions necessary for an exterior member is not desirable. The environment of a vehicle underfloor surface is also associated with a problem that water (e.g., rain water) may go into the inside of the insulating sheet from one end in its longitudinal direction particularly during running. In that event, the water (e.g., rain water) stays inside the insulating sheet until it drains from the other end of the insulating sheet in the longitudinal direction. This may cause corrosion of various members.

In the wire harness disclosed in Patent document 3 in which the metal pipe having the shield wall is employed, whereas it is sufficiently high in terms of functions necessary for an exterior member, it requires a wide variety of metal pipes depending on the diameter of the wire housed, which means increase in the number of components. Also in this wire harness, if water (e.g., rain water) goes into the inside of the metal pipe, the water stays inside the metal pipe until it drains from the other end of the metal pipe in its longitudinal direction. This may cause corrosion of various members.

The present invention has been made to solve the above problems in the art, and an object of the invention is therefore to provide an underfloor shielded harness that can suppress increase in the number of steps of manufacture and the number of components, is sufficiently high in terms of functions necessary for an exterior member, and can lower the probability of corrosion due to water.

Solution to Problems

The above object of the invention is attained by the following configurations:

(1) An underfloor shielded harness which is to be routed across a vehicle body underfloor surface as an outside surface of a vehicle body frame and has a low-voltage cable that includes one or plural wires and a high-voltage cable that includes one or plural wires and to which a higher voltage is to be applied than to the low-voltage cable, wherein the underfloor shielded harness comprises a long conductive plate which is wound so as to have at least two internal spaces in a cross section taken perpendicularly to the longitudinal direction; the high-voltage cable is inserted in one of the at least two internal spaces of the conductive plate and the low-voltage cable is inserted in an internal space other than the one, in which the high-voltage cable is inserted, of the at least two internal spaces; and at least one of the at least two internal spaces communicates with the outside of the spaces formed by the conductive plate.

In the underfloor shielded harness having the configuration of item (1), the high-voltage cable is inserted in one of the internal spaces of the long conductive plate, and the low-voltage cable is inserted in one of the other internal spaces. Therefore, the high-voltage cable and the low-voltage cable can be bundled by the conductive plate and shielded in the respective internal spaces, as a result of which increase in the number of steps of manufacture and the number of components can be suppressed. In addition, because of the use of the conductive plate which is made of an aluminum plate and hence is relatively high in rigidity, the underfloor shielded harness can be sufficiently high in terms of functions necessary for an exterior member. Furthermore, since the conductive plate is wound, it is not necessary to produce conductive plates having a variety of sizes depending on the diameter of the wire housed, unlike in the case of a metal pipe. Thus, increase in the number of components can be suppressed.

Furthermore, in the underfloor shielded harness having the configuration of item (1), since at least one of the at least two internal spaces communicates with the outside the spaces formed by the conductive plate, water that has entered this internal space can drain to the outside, whereby the probability of corrosion can be lowered. Thus, the probability of corrosion due to water can be lowered whereas increase in the number of steps of manufacture and the number of components is suppressed and the underfloor shielded harness is made sufficiently high in terms of functions necessary for an exterior member.

(2) The underfloor shielded harness according to item (1), wherein the conductive plate is wound so as to assume an approximately spiral shape in a cross section taken perpendicularly to the longitudinal direction and thereby has the at least two internal spaces; and an outermost internal space, of the spiral, of the at least two internal spaces communicates with the outside of the spaces formed by the conductive plate.

In the underfloor shielded harness having the configuration of item (2), it suffices for a worker to form a wound, approximately spiral conductive plate through winding in one direction (e.g., he or she need not change the winding direction halfway) and hence he or she can form at least two internal spaces relatively easily. Furthermore, since the outermost internal space of the spiral communicates with the outside of the spaces formed by the conductive plate 103, water that has entered the outermost internal space can drain to the outside, whereby the probability of corrosion can be lowered.

(3) The underfloor shielded harness according to item (2), wherein the internal space in which the high-voltage cable is inserted exists, in the spiral, on the side that is located inside the side where the internal space in which the low-voltage cable is inserted exists.

In the underfloor shielded harness having the configuration of item (3), the internal space in which the high-voltage cable is inserted exists, in the spiral, on the side that is located inside the side where the internal space exists in which the low-voltage cable is inserted, that is, the high-voltage cable which is desired to be shielded more strongly is disposed on the side (i.e., in an inside space of the spiral) surrounded by more shield wall portions of the conductive plate. The shield effect can thus be enhanced further.

(4) The underfloor shielded harness according to item (3), wherein the internal space in which the high-voltage cable is inserted is an innermost space of the spiral and an end of the conductive plate is in contact with a wall of the conductive plate.

In the underfloor shielded harness having the configuration of item (4), since the internal space in which the high-voltage cable is inserted is the innermost space of the spiral and an end of the conductive plate is in contact with the wall of the conductive plate, the high-voltage cable is shielded strongly, whereby lowering of the shield function can be prevented unlike in a case that a gap exists there.

(5) The underfloor shielded harness according to item (3), wherein the internal space in which the high-voltage cable is inserted is an innermost space of the spiral and an end of the conductive plate is not in contact with a wall of the conductive plate.

In the underfloor shielded harness having the configuration of item (5), the internal space in which the high-voltage cable is inserted is the innermost space of the spiral and an end of the conductive plate is not in contact with the wall of the conductive plate. Therefore, water that has entered the innermost internal space drains through the gap between this end and the wall of the conductive plate, whereby the probability of corrosion can be lowered. Furthermore, since the internal space in which the high-voltage cable is inserted is the innermost space of the spiral, the shield function there is not lowered very much by the presence of the gap. Therefore, the probability of corrosion in the innermost space can be lowered whereas the shield function is kept high.

The invention can provide an underfloor shielded harness that can suppress increase in the number of steps of manufacture and the number of components, is sufficiently high in terms of functions necessary for an exterior member, and can lower the probability of corrosion due to water.

BRIEF DESCRIPTION OF DRAWINGS

FIGS. 2A and 2B show a first example and a second example, respectively.

FIGS. 3A and 3B show a first example and a second example, respectively.

DESCRIPTION OF EMBODIMENT

Figure 1:
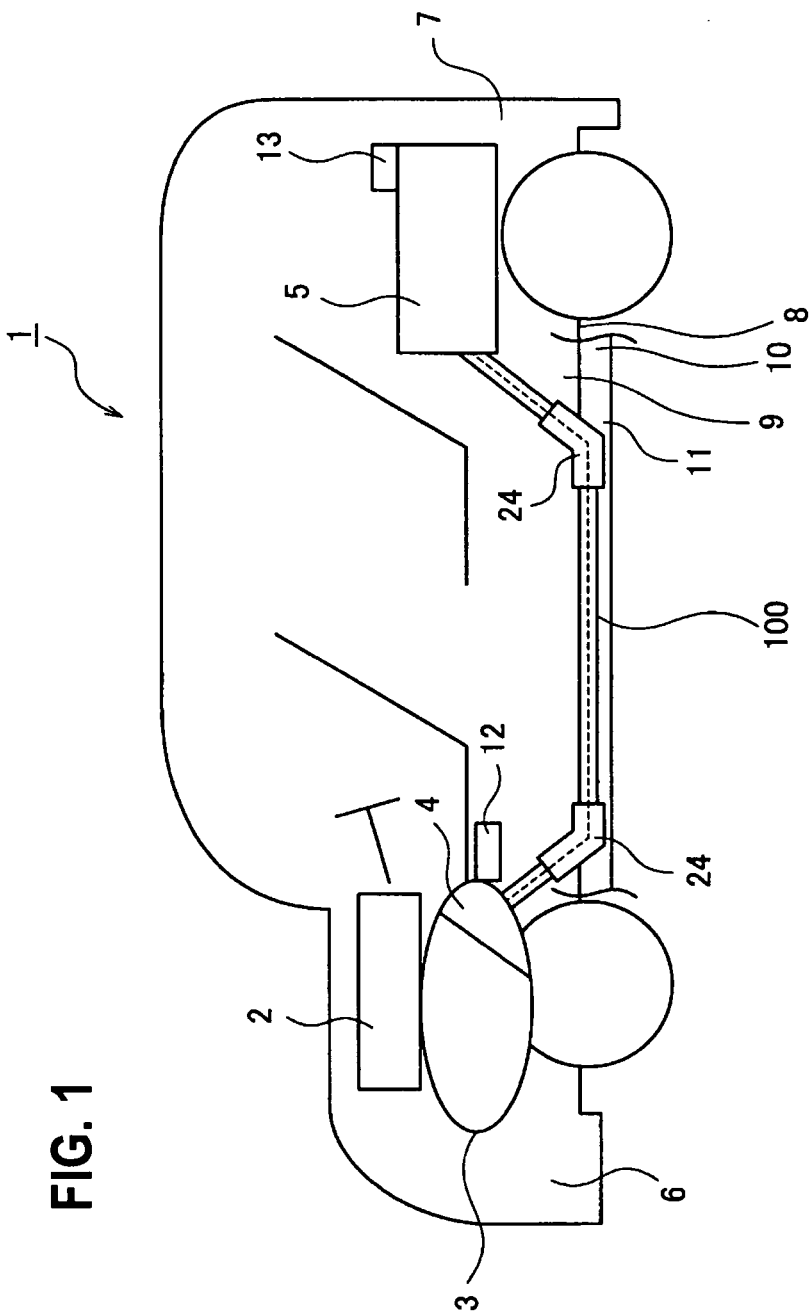
FIG. 1 is a schematic diagram of a vehicle in which an underfloor shielded harness according to an embodiment of the present invention is routed.

A preferred embodiment of the present invention will be hereinafter described with reference to the drawings. FIG. 1 is a schematic diagram of a vehicle in which an underfloor shielded harness according to the embodiment of the invention is routed. As shown in FIG. 1, the vehicle 1 is a hybrid vehicle which is driven by two kinds of motive power of an engine 2 and a motor 3. In the vehicle 1, the motor 3 is supplied with electric power from a battery 5 via an inverter 4. The engine 2, the motor 3, and the inverter 4 are installed inside a vehicle front part 6 that is equipped with front wheels etc. The battery 5 is installed inside a vehicle rear part 7 that is equipped with rear wheels etc.

Referring to FIG. 1, the top surface of a vehicle body frame 8 is a vehicle body floor top surface 9. The bottom surface of the vehicle body frame 8 is a vehicle body underfloor surface 10. The vehicle body underfloor surface 10 is provided with a reinforcement 11 for increasing the vehicle strength that is approximately convex in cross section. The reinforcement 11 is formed so as to extend in the vehicle front-rear direction. An electric connection box 12 such as a relay box is installed inside the vehicle front part 6. Furthermore, a low-voltage battery 13 is also installed inside the vehicle rear part 7.

In the embodiment, it is assumed that the motor 3 is configured so as to include a motor and a generator. And it is assumed that the inverter 4 is configured so as to include an inverter and a converter. It is also assumed that the inverter 4 is an inverter assembly and includes, for example, an air conditioner inverter, a generator inverter, and a motor inverter. The battery 5 is of a Li-ion type and is configured so as to be able to be charged from an external socket (e.g., from a commercial power line). The battery 5 is a module incorporating various functional components (not shown).

In the vehicle 1 having the above configuration, the underfloor shielded harness 100 is disposed so as to connect the inverter 4 and the battery 5.

Figure 2A:
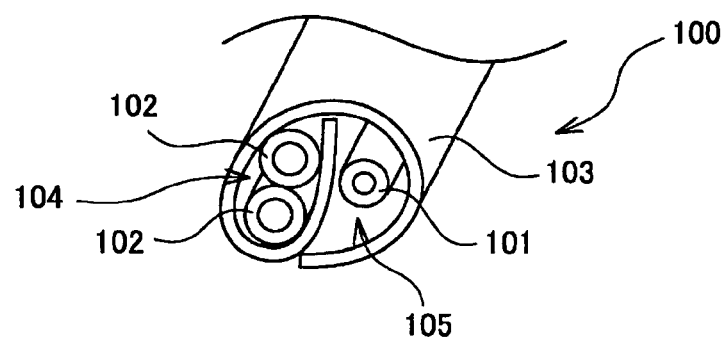
FIGS. 2A and 2B are schematic enlarged views of an underfloor shielded harness shown in FIG. 1.
Figure 2B:
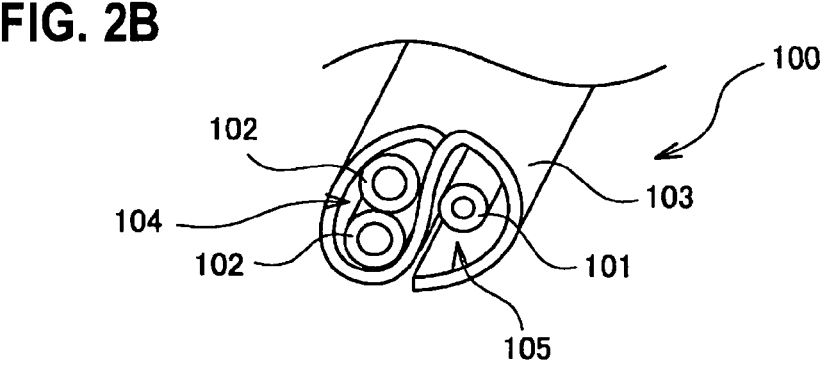

FIGS. 2A and 2B are schematic enlarged views of an underfloor shielded harness 100 shown in FIG. 1; FIGS. 2A and 2B show a first example and a second example, respectively. As shown in FIGS. 2A and 2B, the underfloor shielded harness 100 is routed across the vehicle body underfloor surface (which is the outside surface of the vehicle body frame 8) so as to be fixed to it by fixing members 24 (see FIG. 1), and is equipped with a low-voltage cable 101 and high-voltage cables 102.

The low-voltage cable 101 serves to supply power from the low-voltage battery 13 to various devices. The high-voltage cables 102, to which higher voltages are applied than to the low-voltage cable 101, serve to connect the inverter 4 and the battery 5. Although the single low-voltage cable 101 is shown in FIGS. 2A and 2B, plural low-voltage cables may be provided. Although the two high-voltage cables 102 are shown in FIGS. 2A and 2B, a single high-voltage cable or three or more high-voltage cables may be provided.

Each of the low-voltage cable 101 and the high-voltage cables 102 is composed of a conductor and an insulator that covers the conductor. The material of the conductor is copper, aluminum, or an alloy thereof. The material of the insulator is a single one or a combination of polyethylene (most preferable), vinyl chloride, polyolefin, polyester elastomer, and silicon rubber-based materials.

The underfloor shielded harness 100 according to the embodiment is further equipped with a conductive plate 103. For example, the conductive plate 103 is made of a conductive metal plate such as an aluminum plate, a stainless steel plate, or an iron plate or a conductive resin plate. The use of an aluminum plate is most preferable because it exhibits high moldability. As shown in FIG. 2A, the conductive plate 103 is formed as a long tube by winding a rectangular aluminum plate so as to assume an approximately spiral shape in a cross section taken perpendicularly to its longitudinal direction. Alternatively, as shown in FIG. 2B, the conductive plate 103 may be formed as a long tube by winding a rectangular aluminum plate so as to assume an S shape in a cross section taken perpendicularly to its longitudinal direction.

As shown in FIGS. 2A and 2B, the long tube which is the wound conductive plate 103 has two internal spaces 104 and 105 as seen from the sectional view. Although the two internal spaces 104 and 105 are formed in FIGS. 2A and 2B, three or more internal spaces may be formed.

The above-mentioned high-voltage cables 102 are inserted in one of the two internal spaces 104 and 105, that is, in the internal space 104. The low-voltage cable 101 is inserted in the other of the internal spaces 104 and 105, that is, in the internal space 105.

Since as described above the high-voltage cables 102 are inserted in the one internal space 104 and the low-voltage cable 101 is inserted in the other of the internal space 105, the high-voltage cables 102 can be bundled with the low-voltage cable 101 by means of the conductive plate 103. In addition, the high-voltage cables 102 and the low-voltage cable 101 are shielded being placed in the respective internal spaces 104 and 105. As a result, increase in the number of steps of manufacture and the number of components can be suppressed.

In addition, because of the use of the conductive plate 103 which is made of an aluminum plate and is relatively high in rigidity, the conductive plate 103 is sufficiently high in terms of functions necessary for an exterior member. Furthermore, since the conductive plate 103 is in wound form, it is not necessary to produce conductive plates having a variety of sizes depending on the diameter of the wire housed, unlike in the case of a metal pipe. Thus, increase in the number of components can be suppressed.

Figure 3A:
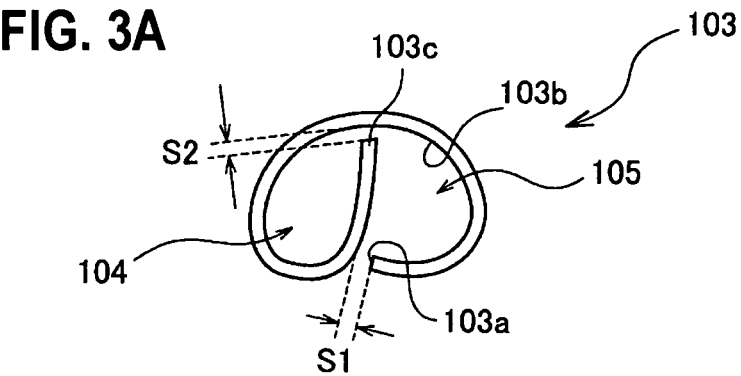
FIGS. 3A and 3B are sectional views showing details of a conductive plate shown in FIG. 2A.
Figure 3B:
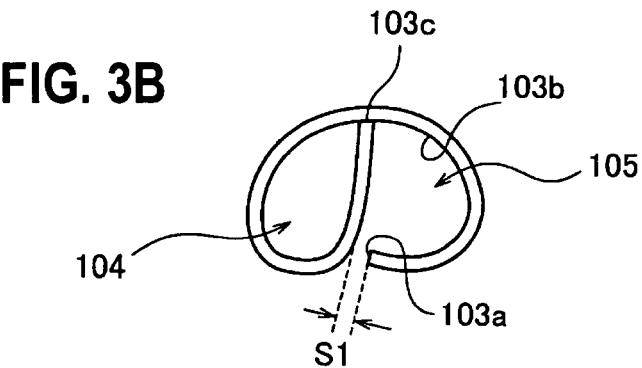

FIG. 3 is sectional views showing details of the conductive plate 103 shown in FIG. 2A; FIGS. 3A and 3B show a first example and a second example, respectively. As shown FIGS. 3A and 3B, in the internal space 105 which is the outermost space, of the spiral, of the two internal spaces 104 and 105 of the conductive plate 103, one end 103a of the conductive plate 103 is not in contact with its wall 103b, that is, a gap S1 exists between them. Therefore, water that has entered the outermost internal space 105 drains through the gap S1 between the one end 103a and the wall 103b of the conductive plate 103, whereby the probability of corrosion can be lowered.

If the gap S1 were too wide, the low-voltage cable 101 and the high-voltage cables 102 might come off. In view of this, the gap S1 is set shorter than the diameter of the cable(s), having a smaller wire diameter, of the low-voltage cable 101 and the high-voltage cables 102 because this measure can prevent corning-off of the low-voltage cable 101 and the high-voltage cables 102 while enabling water drainage.

Figure 4:
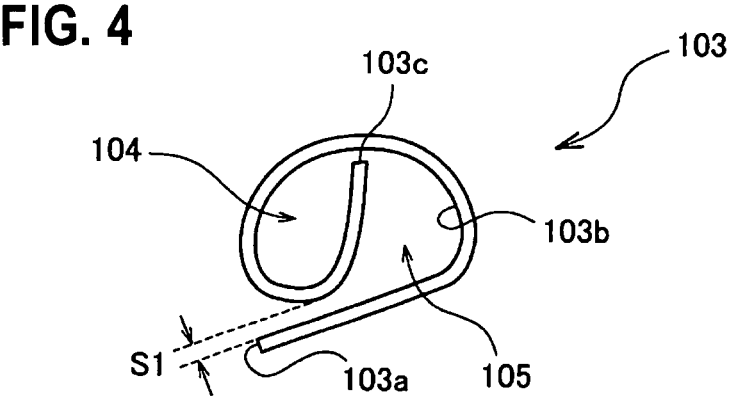
FIG. 4 is a sectional view showing details of a modification of the conductive plate shown in FIG. 2.

FIG. 4 is a sectional view showing details of a modification of the conductive plate 103 shown in FIG. 2. As shown in FIG. 4, the conductive plate 103 may be wound in such a manner that a portion including the one end 103a projects outward from the other portion of the tube. In this case, a gap S1 is formed between portions of the wall 103b of the conductive plate 103.

Reference is now made to FIGS. 2A and 2B again. As shown in FIG. 2A, the internal space 104 in which the high-voltage cables 102 are inserted exists, in the spiral, on the side that is located inside the side where the internal space 105 exists in which the low-voltage cable 101 is inserted. Incidentally, the shield function should be exercised more on the side of the high-voltage cables 102 than on the side of the low-voltage cable 101 because the high-voltage cables 102 have greater influence on external devices etc. Since the conductive plate 103 is wound approximately spirally in the embodiment, the position is surrounded by the conductive plate 103 a larger number of times and hence is shielded more strongly as it goes closer to the center of the spiral. Therefore, in the underfloor shielded harness 100 according to the embodiment, the internal space 104 in which the high-voltage cables 102 are inserted is set, in the spiral, on the side that is located inside the side where the internal space 105 exists.

Furthermore, as shown in FIG. 2A and FIG. 3A, the internal space 104 in which the high-voltage cables 102 are inserted is the innermost space of the spiral. In the internal space 104, the other end (end) 103c of the conductive plate 103 is not in contact with its wall 103b, that is, a gap S2 exists between them. Therefore, water that has entered the innermost internal space 104 drains through the gap S2 between the other end 103c and the wall 103b of the conductive plate 103, whereby the probability of corrosion can be lowered.

Incidentally, when influence on external devices etc. is taken into consideration, it is preferable that the internal space 104 in which the high-voltage cables 102 are inserted be a tightly shut space. However, the presence of the gap S2 noes not lower the shield function very much because the internal space 104 in which the high-voltage cables 102 are inserted is the innermost space of the spiral. That is, since the internal space 104 is the innermost space, the shield function for the high-voltage cables 102 is not lowered very much because they are surrounded by the conductive plate 103 multiple times.

If the gap S2 were too wide, the low-voltage cable 101 and the high-voltage cable 102 might come off. In view of this, the gap S2 is set shorter than the diameter of the cable(s), having a smaller wire diameter, of the low-voltage cable 101 and the high-voltage cable 102 because this measure can prevent coming-off of the low-voltage cable 101 and the high-voltage cable 102 while enabling water drainage.

The internal spaces 104 and 105 are almost or approximately closed spaces (cavities) each of which is at least larger in sectional area than the low-voltage cable 101 and the high-voltage cable 102, is large enough to allow the low-voltage cable(s) 101 and the high-voltage cable(s) 102 to be inserted into it individually, and does not cause coming-off of the low-voltage cable 101 and the high-voltage cable 102.

Where as in the embodiment it is known in advance that the internal space 105 is for insertion of a high-voltage cable(s) 102 and the internal space 104 is for insertion of a low-voltage cable 101, it is preferable that the gap S1 be smaller than the diameter of the low-voltage cable 101 and the gap S2 be smaller than the diameter of the high-voltage cable(s) 102 because these measures can prevent the gaps S1 and S2 from becoming unnecessarily narrow.

Furthermore, as shown in FIG. 3B, it is preferable that in the internal space 104 the other end (end) 103c of the conductive plate 103 be in contact with its wall 103b, that is, no gap S2 exist between them. Where as in this example the other end 103c of the conductive plate 103 is in contact with its wall 103b, the high-voltage cables 102 are shielded more strongly, whereby lowering of the shield function can be prevented unlike in the case where the gap S2 exists.

Also in the example shown in FIG. 3B, as in the modification shown in FIG. 4, a gap S1 may be formed between portions of the wall 103b. The definitions of the internal spaces 104 and 105 are the same as in the example shown in FIG. 3A.

Figure 5:
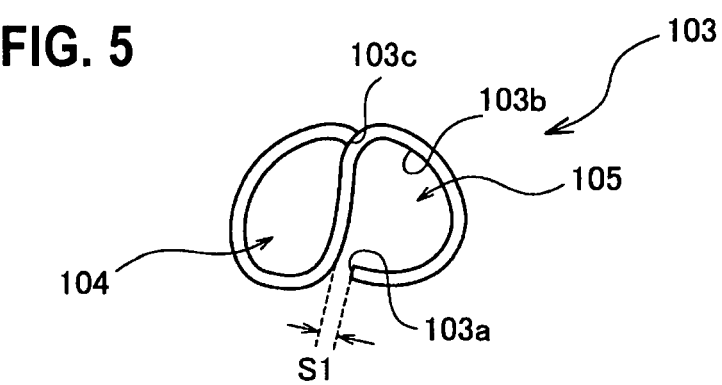
FIG. 5 is a sectional views showing details of a conductive plate shown in FIG. 2A.

FIG. 5 is a sectional view showing details of the conductive plate 103 shown in FIG. 2B. As shown in FIG. 5, in the internal space 105 which is one of the two internal spaces 104 and 105 of the conductive plate 103 which is wound in an S shape, one end 103a of the conductive plate 103 is not in contact with its wall 103b, that is, a gap S1 exists between them. Therefore, water that has entered the internal space 105 drains through the gap S1 between the one end 103a and the wall 103b of the conductive plate 103, whereby the probability of corrosion can be lowered.

If the gap S1 were too wide, the low-voltage cable 101 and the high-voltage cables 102 might come off. In view of this, the gap S1 is set shorter than the diameter of the cable(s), having a smaller wire diameter, of the low-voltage cable 101 and the high-voltage cables 102 because this measure can prevent coming-off of the low-voltage cable 101 and the high-voltage cables 102 while enabling water drainage.

Figure 6:
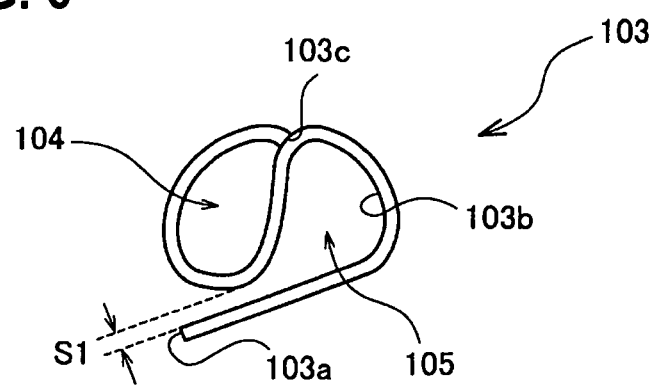
FIG. 6 is a sectional view showing details of a modification of the conductive plate shown in FIG. 5.

FIG. 6 is a sectional view showing details of a modification of the conductive plate 103 shown in FIG. 5. As shown in FIG. 6, the conductive plate 103 may be wound in such a manner that a portion including the one end 103a projects outward from the other portion of the tube. In this case, a gap S1 is formed between portions of the wall 103b of the conductive plate 103.

In the examples shown in FIGS. 5 and 6, the other end 103c of each conductive plate 103 be in contact with its wall 103b. And, as shown in FIG. 2B, the high-voltage cables 102 are inserted in the internal space 104 which is formed in such a manner that the other end 103c is in contact with the wall 103b. This is because each of the conductive plates 103 shown in FIGS. 5 and 6 is wound so as to assume an S shape. A more specific explanation is as follows. In the examples of FIGS. 3 and 4, since each conductive plate 103 is wound approximately spirally and hence the internal space 104 is located inside, even if the internal space 104 in which the high-voltage cables 102 are inserted is associated with the narrow gap S2, electromagnetic waves etc. that leak out through the gap S2 are confined in the internal space 105. However, in the examples of FIGS. 5 and 6, if the other end 103b were not in contact with the wall 103b, electromagnetic waves etc. would not be confined unlike in the examples of FIGS. 3 and 4. In view of this, where the conductive plate 103 is wound so as to assume an S shape, the other end 103b is brought into contact with the wall 103b to tightly shut the internal space 104 in which the high-voltage cables 102 are inserted.

Also in the examples of FIGS. 5 and 6, the definitions of the internal spaces 104 and 105 are the same as in the example shown in FIG. 3A.

Next, an example manufacturing method of the underfloor shielded harness 100 according to the embodiment will be described. To manufacture the underfloor shielded harness 100 according to the embodiment, each of the low-voltage cable 101 and the high-voltage cables 102 is manufactured by continuing to cover the outer circumference a conductor with an insulator using an extruder.

Separately from the above step, a conductive plate 103 is formed through winding into an approximately spiral shape by a shaping method of roll forming. The roll forming, which is a working method of bending a plate material by causing it to pass through a circular die, can shape a plate material into a plate having a desired sectional shape by virtue of a multi-stage configuration. Alternatively, a conductive plate 103 may be wound into an S shape.

Subsequently, the high-voltage cables 102 and the low-voltage cable 101 are inserted into the respective internal spaces 104 and 105 of the conductive plate 103 that has been wound so as to assume an approximately spiral shape. As a result, an underfloor shielded harness 100 as shown in FIG. 2A is manufactured. Where the conductive plate 103 has been wound so as to assume an S shape, the high-voltage cables 102 are inserted into the internal space 104 having no gap and the low-voltage cable 101 is inserted into the internal space 105 having the gap S1. As a result, an underfloor shielded harness 100 as shown in FIG. 2B is manufactured.

As described above, in the underfloor shielded harness 100 according to the embodiment of the invention, the long conductive plate 103 is provided which has the two internal spaces 104 and 105, the high-voltage cables 102 are inserted in one of the internal spaces 104 and 105, and the low-voltage cable 101 is inserted in the other internal space 105. Therefore, the high-voltage cables 102 and the low-voltage cable 101 can be bundled by the conductive plate 103 and shielded in the respective internal spaces 104 and 105, as a result of which increase in the number of steps of manufacture and the number of components can be suppressed. In addition, because of the use of the conductive plate 103 which is made of an aluminum plate and hence is relatively high in rigidity, the underfloor shielded harness 100 can be sufficiently high in terms of functions necessary for an exterior member. Furthermore, since the conductive plate 103 is wound, it is not necessary to produce conductive plates having a variety of sizes depending on the diameter of the wires house, unlike in the case of a metal pipe. Thus, increase in the number of components can be suppressed.

Furthermore, since at least one of the two which are communicates with the outside of the spaces (internal spaces 104 and 105) formed by the conductive plate 103, water that has entered the outermost internal space 105 can drain to the outside, whereby the probability of corrosion can be lowered. Thus, the probability of corrosion due to water can be lowered whereas increase in the number of steps of manufacture and the number of components is suppressed and the underfloor shielded harness 100 is made sufficiently high in terms of functions necessary for an exterior member.

Since it suffices for a worker to form a wound, approximately spiral conductive plate 103 through winding in one direction (e.g., he or she need not change the winding direction halfway) and hence he or she can form at least two internal spaces 104 and 105 relatively easily. Furthermore, since the outermost internal space 105 of the spiral communicates with the outside of the spaces (internal spaces 104 and 105) formed by the conductive plate 103, water that has entered the outermost internal space 105 can drain to the outside, whereby the probability of corrosion can be lowered.

The internal space 104 in which the high-voltage cables 102 are inserted exists, in the spiral, on the side that is located inside the side where the internal space 105 exists in which the low-voltage cable 101 is inserted, that is, the high-voltage cables 102 which are desired to be shielded more strongly are disposed on the side (i.e., in an inside space of the spiral) surrounded by more shield wall portions of the conductive plate 103. The shield effect can thus be enhanced further.

Where the internal space 104 in which the high-voltage cables 102 are inserted is the innermost space of the spiral and the other end 103c of the conductive plate 103 is in contact with the wall 103b of the conductive plate 103, the high-voltage cables 102 are shielded strongly, whereby lowering of the shield function can be prevented unlike in the case where the gap S2 exists.

Where the internal space 104 in which the high-voltage cables 102 are inserted is the innermost space of the spiral and the other end 103c of the conductive plate 103 is not in contact with the wall 103b of the conductive plate 103, water that has entered the innermost internal space 104 drains through the gap S2 between the other end 103c and the wall 103b, whereby the probability of corrosion can be lowered. Furthermore, since the internal space 104 in which the high-voltage cables 102 are inserted is the innermost space of the spiral, the shield function there is not lowered very much by the presence of the gap S2. Therefore, the probability of corrosion in the innermost space can be lowered whereas the shield function is kept high.

Although the invention has been described above using the embodiment, the invention is not limited the above embodiment and various modifications can be made without departing from the spirit and scope of the invention. And the material, shape, dimensions, related numerical values, form of implementation, number, location, etc. of each constituent element of the embodiment are optional and no limitations are imposed on them as long as the invention can be implemented.

For example, although in the underfloor shielded harness 100 according to the embodiment the conductive plate 103 assumes a smooth, approximately spiral shape (see FIGS. 3 and 4), the conductive plate 103 may assume a spiral shape that is somewhat angled or has a straight portion(s).

For example, in the conductive plate 103, the one end 103a or the other end 103c may be adhered to the wall 103b with breaks by applying adhesive to the one end 103a or the other end 103c so as to form breaks.

If possible, the underfloor shielded harness 100 may be manufactured by a method other than the one described above; for example, the conductive plate 103 may be formed by winding a material plate in a state that the low-voltage cable 101 and the high-voltage cables 102 are placed on it.

In addition, although in the embodiment the conductive plate 103 is wound so as to assume an approximately spiral shape or an S shape in cross section, the invention is not limited to such a case; the conductive plate 103 may be wound so as to assume another shape as long as at least two internal spaces 104 and 105 can be formed.

Where the underfloor shielded harness 100 according to the embodiment is installed on a vehicle body to serve as its underfloor shielded harness, it is preferable that the gap S1 be located on the bottom side because this measure allows the water draining function to be exercised effectively.

The features of the above-described underfloor shielded harness according to the embodiment of the invention will be summarized concisely below as items [1]-[5]:

[1] An underfloor shielded harness (100) which is to be routed across a vehicle body underfloor surface (10) as an outside surface of a vehicle body frame (8) and has a low-voltage cable (101) that includes one or plural wires and a high-voltage cable (102) that includes one or plural wires and to which a higher voltage is to be applied than to the low-voltage cable (101), wherein:

the underfloor shielded harness (100) comprises a long conductive plate (103) which is wound so as to have at least two internal spaces (104, 105) in a cross section taken perpendicularly to the longitudinal direction;

the high-voltage cable (102) is inserted in one of the at least two internal spaces (104, 105) of the conductive plate (103) and the low-voltage cable (101) is inserted in an internal space other than the one (105), in which the high-voltage cable (102) is inserted, of the at least two internal spaces (104, 105); and at least one (105) of the at least two internal spaces (104, 105) communicates with the outside of the spaces (internal spaces (104, 105)) formed by the conductive plate (103).

[2] The underfloor shielded harness (100) according to item [1], wherein:

the conductive plate (103) is wound so as to assume an approximately spiral shape in a cross section taken perpendicularly to the longitudinal direction and thereby has the at least two internal spaces (104, 105); and an outermost internal space (105), of the spiral, of the at least two internal spaces (104, 105) communicates with the outside of the spaces (internal spaces (104, 105)) formed by the conductive plate (103).

[3] The underfloor shielded harness (100) according to item [2], wherein the internal space (104) in which the high-voltage cable is inserted exists, in the spiral, on the side that is located inside the side where the internal space (105) in which the low-voltage cable (101) is inserted exists.

[4] The underfloor shielded harness (100) according to item [3], wherein the internal space (104) in which the high-voltage cable (102) is inserted is an innermost space of the spiral and an end (end 103c) of the conductive plate (103) is in contact with a wall (103b) of the conductive plate (103).

[5] The underfloor shielded harness (100) according to item [3], wherein the internal space (104) in which the high-voltage cable (102) is inserted is an innermost space of the spiral and an end (end 103c) of the conductive plate (103) is not in contact with a wall (103b) of the conductive plate (103).

The present application is based on Japanese Patent Application No. 2013-134555 filed on Jun. 27, 2013, the disclosure of which is incorporated herein by reference.

INDUSTRIAL APPLICABILITY

The invention can provide underfloor shielded harnesses that can suppress increase in the number of steps of manufacture and the number of components, are sufficiently high in terms of functions necessary for an exterior member, and can lower the probability of corrosion due to water.

REFERENCE SIGNS LIST

8 . . . Vehicle body frame
10 . . . Vehicle body underfloor surface
101 . . . Low-voltage cable
102 . . . High-voltage cable
103 . . . Conductive plate
103a . . . One end
103b . . . Wall
103c . . . The other end (end)
104, 105 . . . Internal space

The invention claimed is:

1. An underfloor shielded harness which is to be routed across a vehicle body underfloor surface which is an outside surface of a vehicle body frame and has a low-voltage cable that includes one or plural wires and a high-voltage cable that includes one or plural wires and to which a higher voltage higher than a voltage to be applied to the low-voltage cable is to be applied, wherein:

the underfloor shielded harness comprises a long conductive plate which is wound so as to have at least two internal spaces in a cross section taken perpendicularly to a longitudinal direction;

in the long conductive plate, the high-voltage cable is inserted in one of the at least two internal spaces of the conductive plate and the low-voltage cable is inserted in an internal space other than the one, in which the high-voltage cable is inserted, of the at least two internal spaces; and at least one of the at least two internal spaces communicates with an outside of the spaces formed by the conductive plate.

2. The underfloor shielded harness according to claim 1, wherein:

the conductive plate is wound so as to assume an approximately spiral shape in a cross section taken perpendicularly to the longitudinal direction and thereby has the at least two internal spaces; and an outermost internal space, of the spiral, of the at least two internal spaces communicates with the outside of the spaces formed by the conductive plate.

3. The underfloor shielded harness according to claim 2, wherein the internal space in which the high-voltage cable is inserted exists, in the spiral, on a side that is located inside a side where the internal space in which the low-voltage cable is inserted exists.

4. The underfloor shielded harness according to claim 3, wherein the internal space in which the high-voltage cable is inserted is an innermost space of the spiral and an end of the conductive plate is in contact with a wall of the conductive plate.

5. The underfloor shielded harness according to claim 3, wherein the internal space in which the high-voltage cable is inserted is an innermost space of the spiral and an end of the conductive plate is not in contact with a wall of the conductive plate.

* * * * *